UNITED STATES PATENT OFFICE.

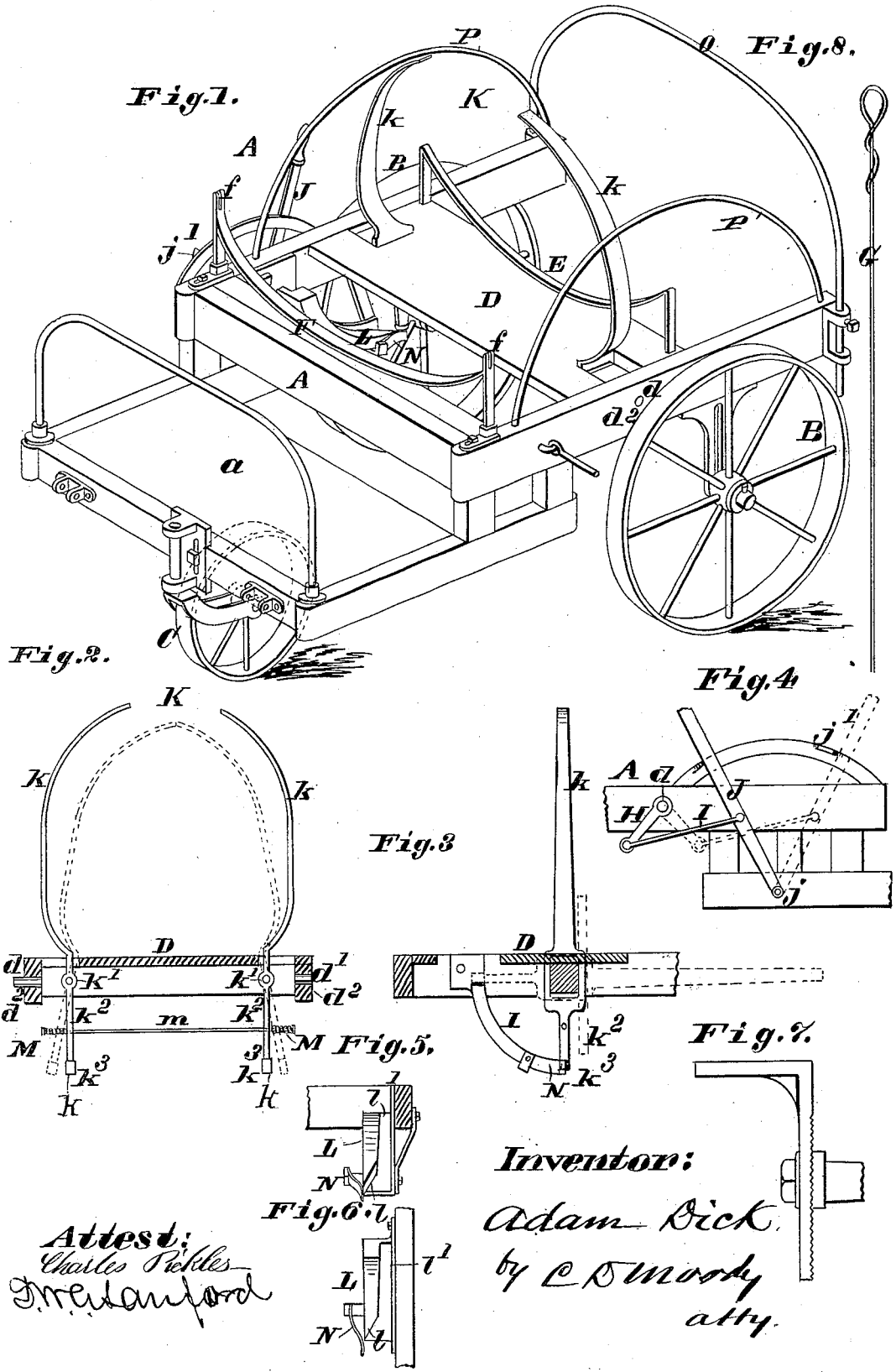

ADAM DICK, OF MOLINE, ILLINOIS.

MACHINE FOR SHOCKING GRAIN.

SPECIFICATION forming part of Letters Patent No. 246,603, dated September 6, 1881.

Application filed April 2, 1881. (No model.)

*To all whom it may concern:*

Be it known that I, ADAM DICK, of Moline, Illinois, have made a new and useful Improvement in Machines for Shocking Grain, of which the following is a full, clear, and exact description, reference being had to the annexed drawings, making part of this specification, in which—

Figure 1 is a view, in perspective, of the improvement; Fig. 2, a detail, being a side elevation of the clamp, and showing the shock-support in longitudinal vertical section; Fig. 3, a detail, being a vertical section taken transversely through the shock-support, and showing one of the clamp-arms and the cam for moving the arm; Fig. 4, a detail, being an elevation (looking toward the side of the carriage) of the parts immediately connected with the tilting of the shock-support; Fig. 5, a detail, being an edge elevation of one of the cams used in moving the clamp-arms, and showing the adjacent frame; Fig. 6, a plan of the cam; Fig. 7, a detail, being a view of one of the bearings of the hind-wheel axles; and Fig. 8, a view of the wire band used in binding the shock.

The same letters denote the same parts.

In another application I have shown a machine for shocking grain, the aim of which is to enable the sheaves of grain to be at once and without first letting them fall from the harvester to the ground assembled into shocks, and then as shocks deposited upon the ground. The machine referred to consists, substantially, of a platform or carriage attached to or caused to travel alongside of a harvester, and upon which the bound sheaves are delivered from the harvester, there received by the operator, placed on end upon the platform or carriage, and in number sufficient to make a shock, then and there bound into shocks, and then and in that form dropped directly downward onto the ground.

The present invention is a modification of a portion of the invention referred to, and in this a platform or carriage is attached to or caused to move with the harvester, and the sheaves are delivered on the platform or carriage as in the original construction. The sheaves, however, instead of being on end while being formed into shocks, are laid horizontally on the platform or carriage, and then, after the shock is formed, or substantially formed, turned into a vertical position and dropped to the ground.

In the annexed drawings, A represents the platform or carriage that is attached to or that moves along at the side of the harvester. It is shown as self-supporting, being furnished with the hind wheels, B B, and the forward wheels, C. The platform or carriage is made vertically adjustable upon the wheels, to adapt it to different harvesters. The operator stands upon the forward end, *a*, of the platform or carriage, and as the sheaves come to him from the harvester (which is not shown, its construction being well understood) he lays them horizontally upon a support, D. To facilitate the forming of the shocks, curved auxiliary supports E F are used preferably in connection with the main support D. The butts of the sheaves project beyond the support E toward the rear end of the platform or carriage, and the heads extend beyond the support F toward the forward end of the platform or carriage.

The support D may be flat, as shown, or of other suitable shape for supporting the pile of sheaves while being formed into a shock. The support D E F is above the level of the stand *a*. The portion D E of the support (and D when that part only is used) is furnished with journals $d$ $d'$, which turn in bearings $d^2$ in the frame *a* of the platform or carriage.

If desired, the three parts D, E, and F may be united in one part to turn in the bearings $d^2$.

The sheaves are piled on the support D E F until a sufficient number is in position to form the shock. A band, such as the wire G, Fig. 8, and which has previously been laid so as to be beneath the sheaves, and preferably upon the rest F, with its ends projecting through the notches *f f*, is then drawn around the sheaves, forming them into a shock, which is now completed, saving the cap-sheaf. The bundle of sheaves is then turned into a nearly-upright position and the cap-sheaf put on. The shock is then turned until it is upright, and then dropped from the carriage or platform, between the sides thereof, onto the ground.

The tilting of the grain is effected as follows: The journal *d* of the shock-support is provided with an arm, H, Fig. 4. A rod, I, connects the arm H with a lever, J, that is pivoted to the platform or carriage at $j$. By moving the lever J, as indicated in Fig. 4, the support D E is rotated in the bearings $d^2$, bringing the shock into position for receiving the cap-sheaf. During this period of the operation the bundle of sheaves should be held so as not to slip from its support. This is effected by means of the clamp K. The latter consists of the arms $k\,k$, which are pivoted to the shock-support at $k'$ $k'$, extending above the support sufficiently and in suitable directions to clamp the bundle of sheaves, and extending below the pivots $k'$, forming the extensions $k^2\,k^2$. As the support D E is tilted, as described, the ends $k^3$ of the arms $k\,k$ encounter cams L L, (one toward each side of the platform or carriage, and suitably attached thereto.) The cams are beveled at $l$ and grooved at $l'$. The ends $k^3\,k^3$ of the arms $k\,k$ encounter the bevels $l\,l$ as soon as the support D E begins to tilt, causing the arms $k\,k$ to assume the position indicated by the dotted lines in Fig. 2, and to clamp the bundle of sheaves sufficiently to hold them upon the support, as desired. The gripe upon the bundle continues until the bundle is nearly in an upright position, when the cap-sheaf is put on the bundle, completing the shock. The lever J at this time may be held by a catch, such as shown at $j'$, Fig. 4. When the cap-sheaf has been attached the support D E and clamp K (carrying the shock) are turned into the position indicated by the dotted lines in Fig. 3, bringing the shock into a vertical position. At this time the ends $k^3\,k^3$ leave the grooves $l'\,l'$ at the upper ends thereof, whereupon the springs M M upon the rod $m$ act to open the arms $k\,k$ and release the shock.

A spring-deflector, N, is preferably used to insure the proper movement of the ends $k^3\,k^3$ against the bevels $l\,l$, the deflectors yielding when the ends $k^3\,k^3$ descend upon the outer sides of the cams L L.

O represents a tie-rod, connecting the rear ends of the car.

The platform or carriage is furnished with side guards, P P, for the better keeping of the sheaves and shock laterally in place.

I claim—

1. The combination of the platform A and a tilting shock-support, on which the sheaves are laid while being formed into a shock and then tilted into a vertical position onto the ground, said platform being opened to the ground from its rear end forward and beneath said support, and the latter being arranged transversely upon the platform and journaled at the sides thereof, for the purpose of tilting the shock onto the ground between the sides of the platform, substantially as described.

2. The combination of the platform A, the tilting support D, and the fixed support F, said platform being opened to the ground from its rear end forward and beneath said tilting support, and the latter being arranged transversely upon the platform, substantially as described.

3. The combination of the platform A, the tilting support D, and the arms $k\,k$, said platform being opened beneath said support, and said support and arms being arranged and operating substantially as described.

4. The combination of the arms $k\,k$, as constructed, and the cams L L, substantially as described.

5. The combination of the arms $k\,k$, as constructed, cams L L, support D, rod $m$, and springs M M, substantially as described.

6. The combination of the platform A, tilting support D, arm H, rod I, arms $k\,k$, as constructed, cams L L, and lever J, substantially as described.

7. The combination of the platform A, having the part $a$, and the shock-support D, said platform being opened to the ground from its rear end forward to the part $a$, and said support being arranged and constructed to tilt, substantially as described.

8. The combination of the platform A, tilting support D, and side guards, P P, said platform being opened from its rear end forward and beneath said support, substantially as described.

9. The combination of the platform A, tilting support D, clamp K, lever J, arm H, rod I, arms $k\,k$, as constructed, and cams L L, substantially as described.

ADAM DICK.

Witnesses:
CHAS. D. MOODY,
CHARLES PICKLES.